United States Patent
Esposito et al.

(10) Patent No.: US 8,322,248 B2
(45) Date of Patent: Dec. 4, 2012

(54) SETTING SCREW FOR A CONTROL LEVER DEVICE

(75) Inventors: Alessandro Esposito, Bergamo (IT);
Gianangelo Pezzotta, Verdello (IT);
Marcello Colombo, Monza (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 670 days.

(21) Appl. No.: 11/722,815

(22) PCT Filed: Dec. 30, 2004

(86) PCT No.: PCT/IT2004/000742
§ 371 (c)(1),
(2), (4) Date: Jun. 26, 2007

(87) PCT Pub. No.: WO2006/070419
PCT Pub. Date: Jul. 6, 2006

(65) Prior Publication Data
US 2008/0044253 A1    Feb. 21, 2008

(51) Int. Cl.
*B62K 23/06* (2006.01)
*B62L 3/02* (2006.01)

(52) U.S. Cl. ........ 74/489; 74/473.14; 74/502.2; 74/518; 74/525; 188/24.11; 188/344

(58) Field of Classification Search ................. 74/500.5, 74/501.5, 501.5 H, 501.6, 502.2, 525, 551.1, 74/551.3, 489, 522, 526, 518; 411/393, 125, 411/127, 132–134, 143, 146, 397; 188/24.11, 188/344; 303/137; 42/136
See application file for complete search history.

(56) References Cited

U.S. PATENT DOCUMENTS

| | | | | |
|---|---|---|---|---|
| 224,472 A * | 2/1880 | Peck et al. | ..... | 411/143 |
| 603,050 A * | 4/1898 | Sargent | ..... | 411/126 |
| 884,290 A * | 4/1908 | De Oca | ..... | 411/143 |
| 2,013,526 A * | 9/1935 | Schmitt | ..... | 411/198 |
| 2,177,865 A * | 10/1939 | Collon | ..... | 411/128 |
| 2,251,560 A | 8/1941 | White | | |
| 2,283,494 A * | 5/1942 | Erdman | ..... | 470/4 |
| 3,009,176 A * | 11/1961 | Knocke | ..... | 470/4 |
| 3,438,416 A * | 4/1969 | Thurston | ..... | 411/134 |
| 3,440,922 A * | 4/1969 | Cohen | ..... | 411/397 |
| 3,468,211 A * | 9/1969 | Suan | ..... | 411/397 |
| 3,648,374 A * | 3/1972 | Lewis | ..... | 42/136 |
| 4,301,694 A * | 11/1981 | Costa | ..... | 74/518 |

(Continued)

FOREIGN PATENT DOCUMENTS

DE    8913278    4/1990
(Continued)

*Primary Examiner* — James Pilkington
*Assistant Examiner* — Thomas Diaz
(74) *Attorney, Agent, or Firm* — Shoemaker and Mattare

(57) ABSTRACT

An adjusting screw (15) for a control lever device (1) for vehicles, wherein said adjusting screw (15) comprises a screw body (18) with a threaded shank (19) that can be screwed in a corresponding threaded hole (16) of the lever device (1) and a locking body (26) pivotally connected to the screw body (18). The locking body (26) comprises contact means (27) interacting with the screw body (28, 18) such as to counteract the rotation of the locking body (26) relative to the screw body (18) to a certain extent and anchoring means (29) engaging an anchoring seat (17) of the lever device (1) such as to prevent that the locking body (26) may rotate relative to the threaded hole (16) of the lever device (1).
There are also provided means (25) for preventing that the locking body (26) may be displaced along the shank (19) of the screw body (18).

10 Claims, 4 Drawing Sheets

U.S. PATENT DOCUMENTS

| | | | |
|---|---|---|---|
| 4,575,961 A * | 3/1986 | Mikuta et al. | 42/136 |
| 4,974,274 A * | 12/1990 | Compton et al. | 470/11 |
| 5,050,381 A * | 9/1991 | Matsuno et al. | 60/584 |
| 5,636,518 A * | 6/1997 | Burgoyne et al. | 60/594 |
| 6,179,537 B1 * | 1/2001 | Anders | 411/392 |
| 2003/0183038 A1 * | 10/2003 | Cornolti et al. | 74/525 |

FOREIGN PATENT DOCUMENTS

| | | |
|---|---|---|
| DE | 9006210 | 8/1990 |
| EP | 0893337 | 1/1999 |
| GB | 524717 | 8/1940 |
| JP | 2001018876 | 1/2001 |

* cited by examiner

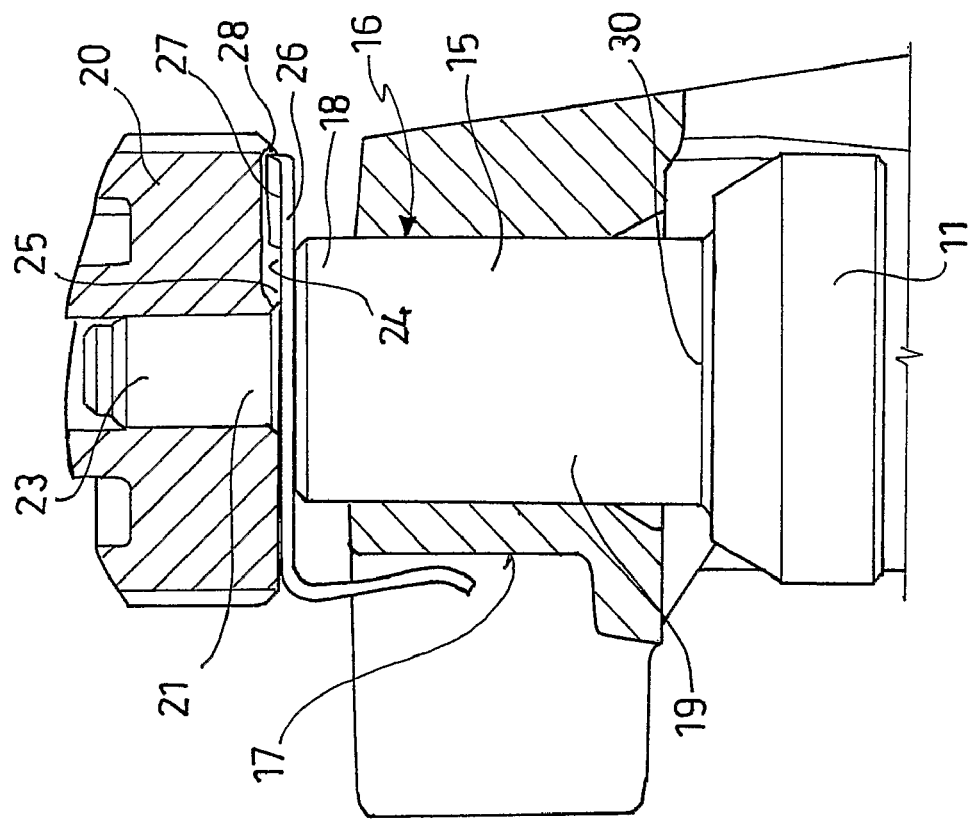
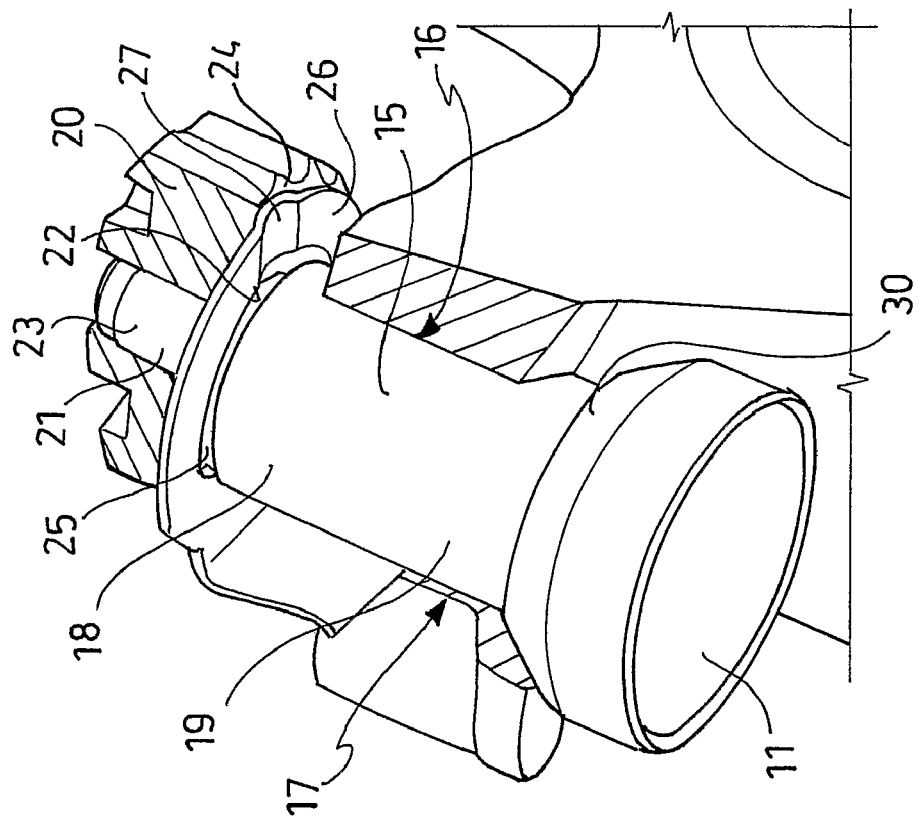
FIG.4
FIG.5

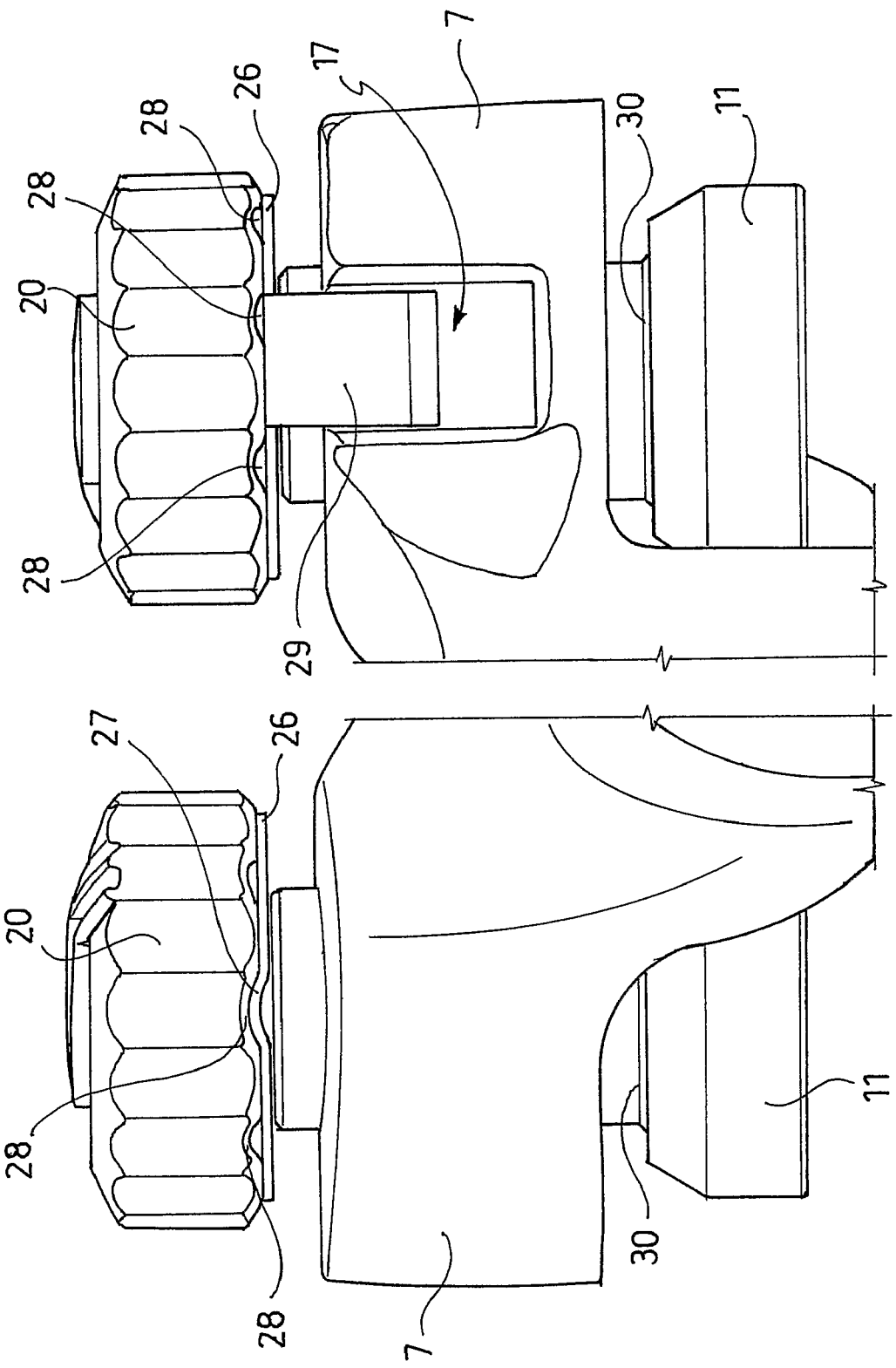

SETTING SCREW FOR A CONTROL LEVER DEVICE

FIELD OF THE INVENTION

The present invention relates to control lever devices for vehicles, particularly a lever device for motorcycles in which the rest position of the lever can be adjusted.

BACKGROUND OF THE INVENTION

In motorcycles, the brake and clutch are manually actuated by means of a lever device that is mounted on the handlebar of the motorcycle, a hydraulic tube or a Bowden cable extending therefrom to the system to be controlled, such as a brake or a clutch.

The lever of the lever device is usually arranged on the grip of the handlebar and the motorcyclist, in order to actuate the lever, grips the handlebar together with the lever and clenches the hand such as to rotate the lever towards the grip. The movement of the lever produces a thrust force acting on the hydraulic piston, the stroke or position thereof defining the fluid pressure inside said hydraulic pipe for the control of the brake or clutch. Upon actuation by means of a Bowden cable, the movement of the lever produces a traction force acting on the cable controlling the brake or clutch.

Since the different handlebars of motorcycles have different shapes and the motorcyclists' hands also have not the same shape and size, the need is felt to be able to adjust the rest position of the lever relative to the handlebar grip.

A number of various solutions have been suggested to provide an adjustment of the position of the lever. A group of these solutions provides an adjustment screw being screwed in a suitable threaded hole of the lever such that an end portion of the shank of the adjusting screw projects from the lever hole and abuts against a seat of the support structure of the lever device or against a transmission portion being interposed between the lever and the piston to be actuated.

By turning the adjusting screw, the length of its projecting portion, and hence the distance between the lever and said seat against which the adjusting screw abuts, can be changed.

In order to prevent that the adjusting screw may be accidentally and unvoluntarily rotated, for example both because of the vibrations of the motorcycle and a repeated actuation of the lever, it is known to provide locking devices for the screw, such as a nut or a ring nut being screwed on the adjusting screw and tightenable against the lever such that the threading of the adjusting screw is axially preloaded against that of the lever hole in order to increase the friction and accordingly the resistance against loosening of the screw.

This solution has proved to be not very reliable, particularly for sport motorcycles, which entail strong vibrations in use that are suitable to loosen the adjusting screw despite the locking ring nut.

Furthermore, the ring nut requires that a tool (nut wrench) be used for loosening and tightening the ring nut whenever the position of the lever requires to be adjusted.

A further solution envisaged by the inventor of the present invention provides an elastic plate placed between the head of the adjusting screw and the lever in order to provide either an elastic or snap locking of the adjusting screw in the selected position.

This solution would render the adjusting screw less sensitive to vibrations only when the screw head is sufficiently close to the lever to ensure a high preload of the elastic plate. This would entail either an undesired restriction of the adjusting stroke or an uneffective locking when the elastic plate is not sufficiently preloaded, i.e. pre-deformed.

The object of the present invention is therefore to provide an adjusting screw for control lever devices with adjusting lever having such characteristics as to overcome the drawbacks mentioned with reference to prior art as well as facilitating the assembly and maintenance of the adjusting screw.

BRIEF DESCRIPTION OF THE INVENTION

This and other objects are achieved by means of an adjusting screw for a control lever device for vehicles, in which said adjusting screw comprises:
- a screw body with a threaded shank to be screwed in a corresponding threaded hole of the lever device;
- a locking body pivotally connected to the screw body, the locking body comprising:
    - contact means interacting with the screw body such as to counteract the rotation of the locking body relative to the screw body to a certain extent;
    - anchoring means suitable to engage a seat of the lever device such as to prevent that the locking body may rotate relative to the threaded hole of the lever device, in which there are provided means for preventing that the locking body may be displaced along the shank of the screw body, independently of the adjustment position of the adjusting screw inside the threaded hole.

The object of the present invention is further achieved by means of a control lever device according to claim 12.

BRIEF DESCRIPTION OF THE DRAWINGS

In order to better understand the invention and appreciate the advantages thereof, an embodiment thereof will be described below by way of non-limiting example, with reference to the annexed drawings, in which:

FIGS. 2 to 5 are sectional views of several details of the device from FIG. 2;

FIGS. 6 and 7 are views of several details of the device from FIG. 2.

DETAILED DESCRIPTION OF EMBODIMENTS

Figure 1:
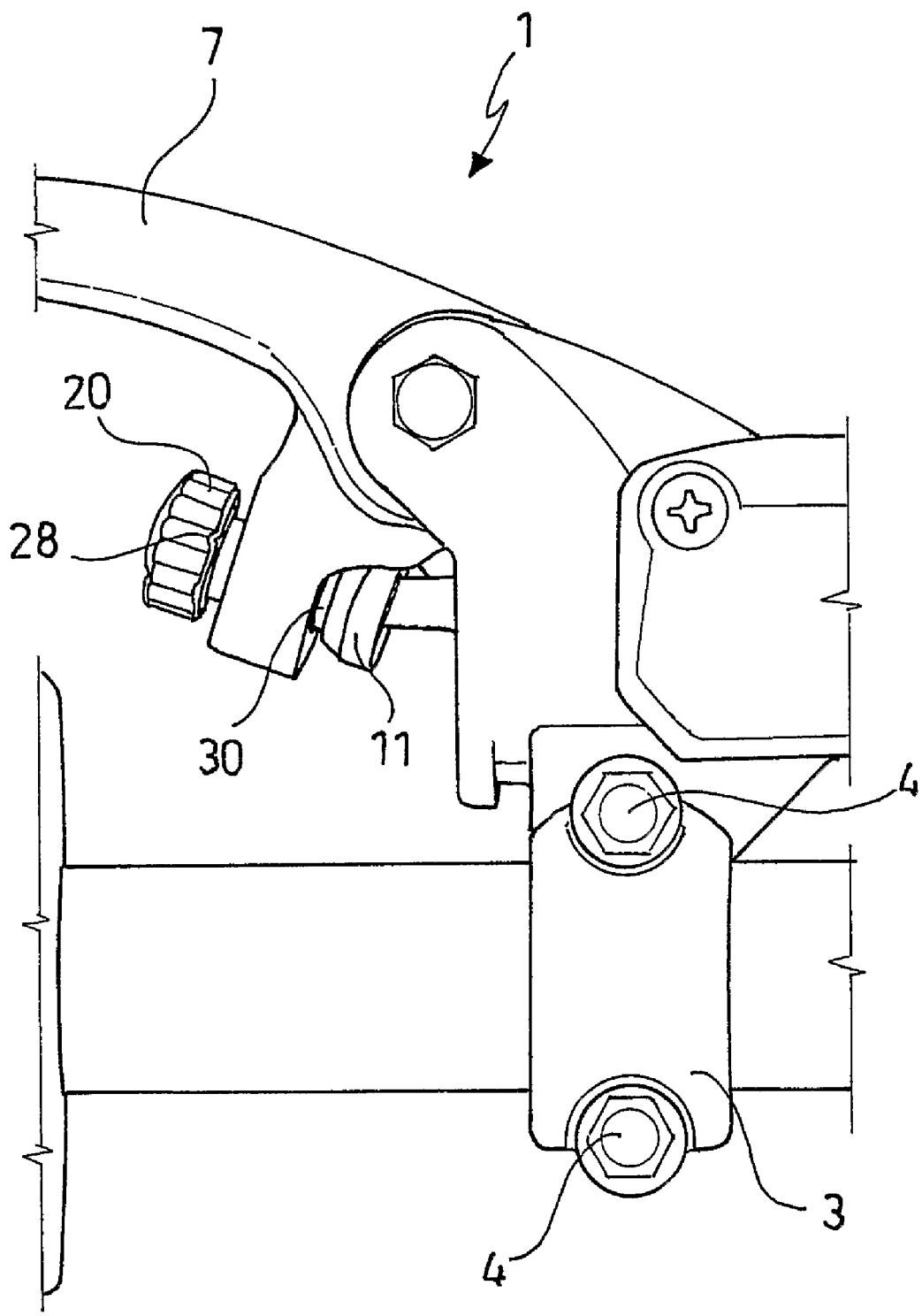
FIG. 1 is a perspective view of an embodiment of the device according to the invention.
Figure 2:
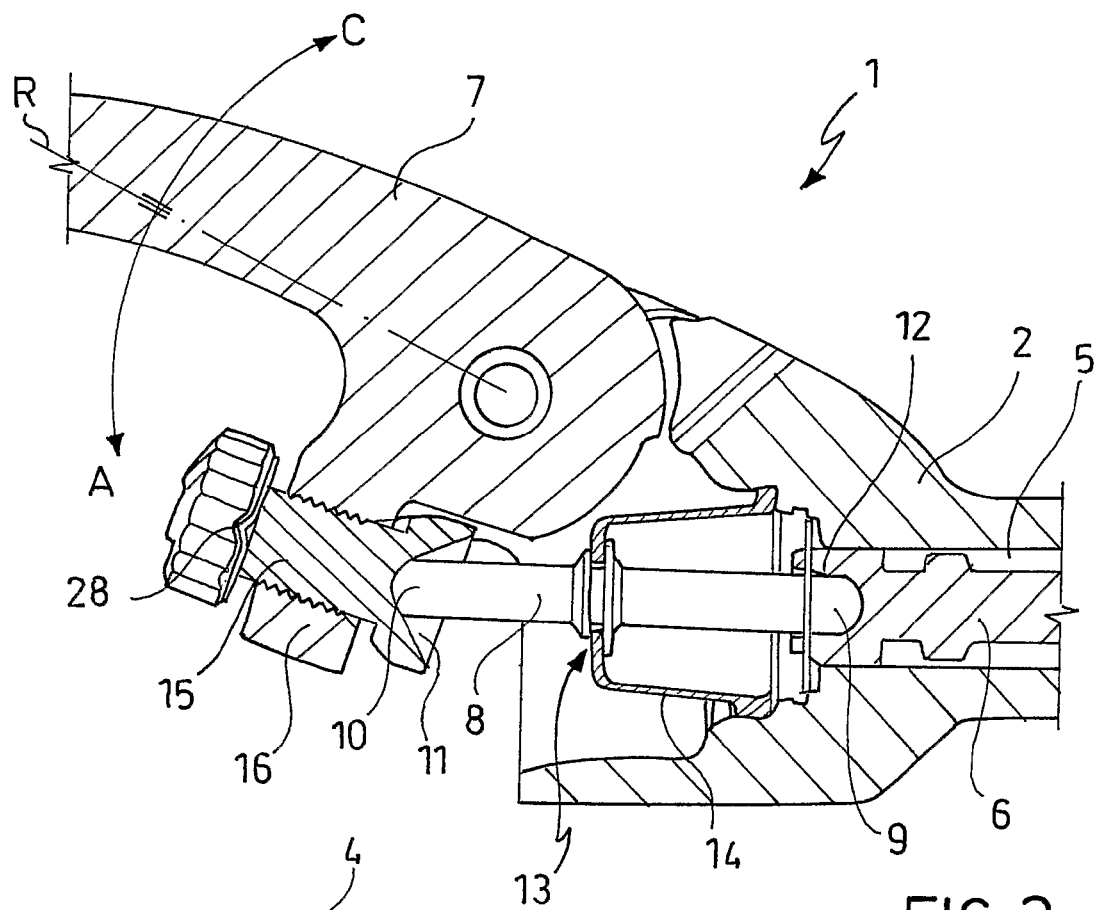
Figure 3:
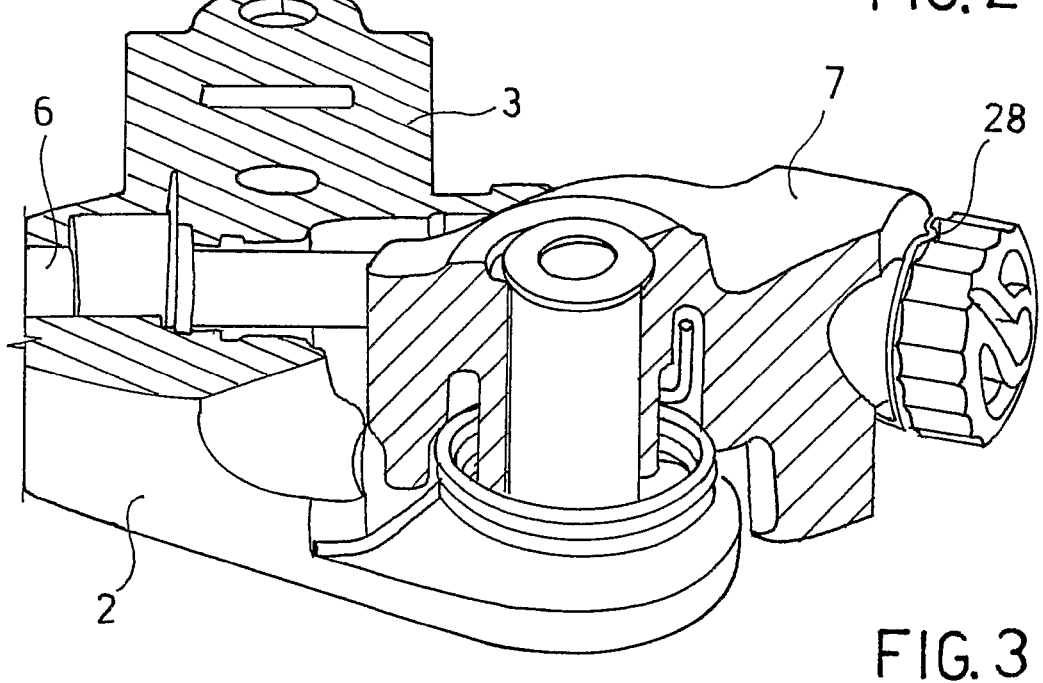

With reference to the figures, a control lever device is generally designated with 1.

The device 1 comprises a support structure 2 with means for connecting the device 1 to a handlebar, for example one or more tightening portions 3 provided with suitable holes 4 that are optionally threaded to house clamping screws. To the support structure 2 there is connected a cylinder-piston unit, for example a cylindrical housing 5 directly made in the support structure 2 that slidingly houses a piston 6. A lever 7 is pivotally connected to the support structure 2 along an angular actuation stroke A extending from an angular rest position R of lever 7 in a first direction of rotation and along an angular collapse stroke C extending from said angular rest portion R in a second direction of rotation opposite to the first direction of rotation. A transmission portion 8 is associated to the device 1 such that the movement of lever 7 is transmitted along the angular actuation stroke A to the cylinder-piston unit, particularly to piston 6. The transmission portion 8 is arranged relative to lever 7 such that, when the lever 7 is in the angular collapse stroke C, it is separated from the transmission portion 8. When the lever 7 is in the angular actuation stroke A, it rests against the transmission portion 8 such as to permit the transmission of the movement of the lever 7 to the cylinder-piston unit, particularly piston 6, in order to actuate the brake or the clutch. The adjusting screw that will be described below can also be used with conventional non-collapsible levers.

The transmission portion 8 is made, for example, as an elongated prop having a preferably round cross-sectional shape. The prop has a first end 9 being permanently held in contact with a seat 12 of piston 6 and a second free end 10 suitable to abut against a suitable seat 11 of lever 7, when the latter is in the rest position R and/or in the angular actuation stroke A. Advantageously, the seat 11 is directly formed on an adjusting screw that will be described below.

The transmission portion 8 comprises, in an intermediate area between the first end 9 and the second end 10, a connecting portion 13 for the connection of the transmission portion 8 to an elastic gasket 14 being provided for protecting the cylinder-piston unit from the external environment.

The gasket 14 holds the transmission portion 8, i.e. the prop, elastically in a preset position at least when the lever 7 is in the angular collapse stroke C.

In the control lever device, particularly in the lever 7, there is formed a threaded hole 16 to house an adjusting screw 15 suitable to act upon lever 7 such that the rest position R of lever 7 relative to the support structure 2 can be adjusted by rotating the adjusting screw 15.

The threaded hole 16 is formed in the lever 7 in such a position that the adjusting screw 15 can rest by means of said seat 11 against the free end 10 of the transmission portion 8 for the movement of lever 7 to be transmitted to the transmission portion 8 and therefrom to the piston 6.

The adjusting screw 15 comprises a screw body 18 with a threaded shank 19 that can be screwed in the threaded hole 16 of the lever device 1 as well as a locking body pivotally connected to the screw body 18. The locking body comprises, in turn, contact means interacting with the screw body 18 such as to counteract the rotation of the locking body relative to the screw body 18 to a certain extent.

The locking body further comprises anchoring means suitable to engage an anchoring seat 17 of the lever device 1 such as to prevent that the locking body may rotate relative to the threaded hole 16.

Advantageously, the adjusting screw 15 comprises means for preventing that the locking body may be displaced along the shank 19 of the screw body 18, independently of the position of the adjusting screw 15 inside the threaded hole 16, such that the engagement of the contact means against the screw body remains constant despite the axial displacements of the adjusting screw.

In accordance with the embodiment shown in the figures, the screw body 18 further comprises a actuating head 20 that is rotatably integrally connected (preferably in a removable manner) to a first end 21 of shank 19 to allow the shank 19 to be screwed inside the threaded hole 16 by means of the manual rotation of the actuating head 20.

The first end 21 of shank 19 has a front surface 22 from which there protrudes an elongated portion 23 for connecting the shank 19 to the actuating head 20. Preferably, the elongated portion 23 protrudes from an intermediate portion having a greater diameter than the diameter of the elongated portion, though being smaller than that of the remaining part of the shank 19.

Advantageously, the front surface 22, a part of the elongated portion 23, i.e. the intermediate portion, and a contact surface 24 of the actuating head define a substantially annular seat 25 to house the locking body such as to prevent that it may be displaced along the shank 19.

The locking body is advantageously embodied by a substantially annular elastic plate 26 extending about the shank 19 of the screw body 18 (particularly about the elongated portion 23 or the intermediate portion), where it is housed in the annular seat 25. The elastic plate 26 has one or more shrinkable projections 27 suitable to snap engage at least one cavity 28 being generally formed in the screw body 18 such as to provide said contact means.

In accordance with a preferred embodiment, the cavities 28 are formed in the contact surface 24 of the actuating head 20. The intermediate portion of the elongated portion 23 advantageously provides a stop surface for the actuating head 20 such that the axial length of the intermediate portion defines the relative position between the locking body, i.e. the elastic plate 26, and the contact surface 24 of the actuating head 20 and hence the amount of elastic preload of the elastic plate 26 itself.

Alternatively or in addition thereto, the contact means can be provided either as elastic friction means, snap elastic means, clamping friction means or threaded clamping means.

From the annular elastic plate 26 there extends an anchoring tab 29 (for example shown in FIG. 4) in the longitudinal direction of shank 19. The anchoring tab 29 is suitable to rest against the anchoring seat 17 of lever 7 and can slide along this anchoring seat 17 to follow the stroke of shank 19 within the threaded hole 16.

The anchoring seat 17 is preferably formed on the outer surface of lever 7 and substantially extends in the longitudinal direction of the threaded hole 16 to allow the displacement of anchoring tab 29 in said direction, while preventing that it may rotate together with the shank 19 of the adjusting screw 15.

In accordance with the embodiment illustrated in the figures, the seat 11 engaging the transmission portion 8 is directly formed at a second end 30 of the shank 19 that is placed opposite the actuating head 20. Advantageously, the seat 11 is funnel-shaped to facilitate the proper alignment of the adjusting screw with the transmission portion of the control lever device, particularly when the lever 7 enters from the angular collapse stroke C in the rest position R.

In accordance with a further embodiment both the actuating head 20 and the seat 11 have a greater diameter than the diameter of the threaded shank, such that the adjusting screw 15, when mounted, substantially cannot be lost.

The operation of the adjusting screw according to the invention will be described below.

The shank of the adjusting screw is screwed in the threaded hole of the lever to such an extent that the front surface of the shank emerges from the aperture of the threaded hole. The annular elastic plate can be now fitted on the elongated connecting portion, by directing the annular elastic plate such that the anchoring tab is aligned with the anchoring seat of the lever. Finally, the actuating head is fitted on the elongated connecting portion and joined thereto by means of either a shape or interference connection. The annular elastic plate is now housed in the seat formed by the front surface of the shank and the contact surface of the actuating head which prevent it from being displaced along the shank of the adjusting screw. The width of the annular seat, the height of the shrinking projections 27 of the elastic plate and the depth of cavities 28 of the actuating head define the elastic preload of the elastic plate and, accordingly, the strength of the same against a relative rotation between the screw body and the annular elastic plate, i.e. the lever 7. This strength remains constant independently of the adjusting position of the adjusting screw and is entirely insensitive to the vibrations of the motorcycle.

It is further advantageous that the surface of the lever or the support structure of the control lever device does not act as the friction surface to lock the adjusting screw. This facilitates the manufacture of an optional surface covering for example for the lever.

The invention claimed is:

1. An adjusting screw assembly for a control lever device for a vehicle, said lever device having a threaded hole therein and said adjusting screw assembly comprising:
   a threaded shank which is screwed into said threaded hole,
   an actuating head affixed to a first end of the shank for unitary rotation therewith,
   a funnel shaped seat formed at a second end of the shank opposite the actuating head, wherein both the actuating head and the funnel shaped seat have a diameter which is greater than a diameter of the threaded shank,
   at least one depression on a contact surface of the actuating head facing the threaded shank,
   said shank having an annular seat adjacent said actuating head, and
   a locking body mounted on the shank, said locking body comprising
   an annular locking plate seated in said annular seat on said shank, said annular seat preventing the annular locking plate from moving along the shank, the annular locking plate having at least one projection which engages the depression in the actuating head so as to prevent unintended rotation of the actuating head with respect to the locking body, the plate being elastically deformable so that application of sufficient torque to the actuating head disengages the projection from the depression and allows the actuating head to turn with respect to the locking body, and
   an anchoring tab extending from the annular locking plate for abutting the lever device so as to prevent the locking body from rotating with respect to the threaded hole
   wherein the actuating head is removably connected to the first end of the shank and the first end of the shank has a front surface from which an elongated connecting portion protrudes for connecting the shank to the actuating head, such that said contact surface of the actuating head faces said front surface, wherein the front surface works together with a part of the elongated portion and with the contact surface to form said annular seat to house the locking body in a manner that the engagement of the projection of the locking plate with the depression on the contact surface remains constant.

2. The adjusting screw assembly according to claim 1, wherein the anchoring tab is bent with respect to the annular locking plate in a longitudinal direction of the shank, said anchoring tab being provided for sliding along a corresponding anchoring seat of the lever device in order to follow the stroke of the shank in the threaded hole.

3. The adjusting screw assembly according to claim 2, wherein said funnel shaped seat abuts against a transmission portion of the control lever device to facilitate the proper alignment of the adjusting screw with the transmission portion.

4. The adjusting screw assembly according to claim 1, wherein said funnel shaped seat abuts against a transmission portion of the control lever device to facilitate the proper alignment of the adjusting screw with the transmission portion.

5. A control lever device for a vehicle, wherein said device comprises:
   a support structure with means for connecting the device to a handlebar;
   a cylinder-piston unit connected to the support structure;
   a lever pivotally connected to the support structure along an angular actuation stroke;
   a transmission portion associated with the device such as to transmit an actuation movement from the lever to the cylinder-piston unit;
   a threaded hole formed in the device to house an adjusting screw acting on the lever such that a rest position of the lever relative to the support structure can be adjusted by rotating the adjusting screw, wherein the adjusting screw comprises:
   a screw body with a threaded shank that is screwed into a corresponding threaded hole of the lever device; and
   a locking body being pivotally connected to the screw body, the locking body comprising:
   an anchoring tab configured to engage an anchoring seat of the lever device such as to prevent the locking body from rotating relative to the threaded hole of the lever device;
   an elastic annular locking plate seated in an annular seat of the shank, so as to prevent displacement of the locking body along the shank of the screw body and detachment of the locking body from the shank, the annular elastic plate having one or more deformable projections which elastically engage at least one cavity formed in the screw body at said annular seat such as to counteract the rotation of the locking body relative to the screw body to a certain extent,
   wherein said screw body comprises an actuating head removably connectable to a first end of the shank for unitary rotation therewith and a funnel shaped seat directly formed at a second end of the shank opposite the actuating head, wherein both the actuating head and the funnel shaped seat have a diameter which is greater than a diameter of the threaded shank, wherein said annular seat is adjacent said actuating head and said cavity is formed in the actuating head, wherein the first end of the shank has a front surface from which an elongated connecting portion protrudes for connecting the shank to the actuating head, such that a contact surface of the actuating head forming said cavity faces said front surface, wherein the front surface works together with a part of the elongated portion and the contact surface said annular seat to house the locking body in a manner that the engagement of the projection of the locking plate with the cavity on the contact surface remains constant independently from axial displacements of the adjusting screw within the threaded hole.

6. The device according to claim 5, wherein said anchoring seat extends in the longitudinal direction of the threaded hole and allows the anchoring tab to be displaced along said direction, thereby preventing the locking body from rotating together with the shank of the adjusting screw.

7. The device according to claim 5, wherein said threaded hole is formed in said lever of said control lever device in such a position that the funnel shaped seat of the adjusting screw can rest against the transmission portion in order to transmit movement of the lever to the transmission portion.

8. A control lever device for a vehicle, wherein said device comprises:
   a support structure with means for connecting the device to a handlebar;
   a cylinder-piston unit connected to the support structure;
   a lever pivotally connected to the support structure along an angular actuation stroke;
   a transmission portion associated with the device such as to transmit an actuation movement from the lever to the cylinder-piston unit;

a threaded hole formed in the device to house an adjusting screw acting on the lever such that a rest position of the lever relative to the support structure can be adjusted by rotating the adjusting screw, wherein the adjusting screw comprises:

a screw body with a threaded shank that is screwed into a corresponding threaded hole of the lever device; and a locking body being pivotally connected to the screw body, the locking body comprising:

an anchoring tab configured to engage an anchoring seat of the lever device such as to prevent the locking body from rotating relative to the threaded hole of the lever device;

an elastic annular locking plate seated in an annular seat of the shank, so as to prevent displacement of the locking body along the shank of the screw body and detachment of the locking body from the shank, the annular elastic plate having one or more deformable projections which elastically engage at least one cavity formed in the screw body at said annular seat such as to counteract the rotation of the locking body relative to the screw body to a certain extent, wherein said screw body comprises an actuating head removably connectable to a first end of the shank for unitary rotation therewith and a funnel shaped seat directly formed at a second end of the shank opposite the actuating head, wherein both the actuating head and the funnel shaped seat have a diameter which is greater than a diameter of the threaded shank, wherein said annular seat is adjacent said actuating head and said cavity is formed in the actuating head, wherein said anchoring seat extends in the longitudinal direction of the threaded hole and allows the anchoring tab to be displaced along said direction, thereby preventing the locking body from rotating together with the shank of the adjusting screw and the anchoring tab is bent with respect to the annular locking plate in a longitudinal direction of the shank.

9. The device according to claim 8, wherein said threaded hole is formed in said lever of said control lever device in such a position that the funnel shaped seat of the adjusting screw can rest against the transmission portion in order to transmit movement of the lever to the transmission portion.

10. The device according to claim 8, wherein the first end of the shank has a front surface from which an elongated connecting portion protrudes for connecting the shank to the actuating head, such that a contact surface of the actuating head forming said cavity faces said front surface, wherein the front surface defines together with a part of the elongated portion and the contact surface said annular seat to house the locking body in a manner that the engagement of the projection of the locking plate with the cavity on the contact surface remains constant independently from axial displacements of the adjusting screw within the threaded hole.

* * * * *